United States Patent
Yeo et al.

(10) Patent No.: US 9,217,895 B2
(45) Date of Patent: Dec. 22, 2015

(54) DISPLAY APPARATUS

(75) Inventors: Dongmin Yeo, Asan-si (KR); GiCherl Kim, Asan-si (KR); Byungchoon Yang, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 728 days.

(21) Appl. No.: 13/191,853

(22) Filed: Jul. 27, 2011

(65) Prior Publication Data

US 2012/0182765 A1 Jul. 19, 2012

(30) Foreign Application Priority Data

Jan. 19, 2011 (KR) .................. 10-2011-0005566

(51) Int. Cl.
*F21V 8/00* (2006.01)
*G02F 1/1335* (2006.01)

(52) U.S. Cl.
CPC ........ *G02F 1/133615* (2013.01); *G02B 6/0068* (2013.01); *G02B 6/0078* (2013.01)

(58) Field of Classification Search
CPC ............ G02F 1/133615; G02B 6/0068; G02B 6/0078
USPC ............... 362/616, 601, 621, 812; 40/661.02, 40/452, 540, 546, 624
See application file for complete search history.

(56) References Cited

U.S. PATENT DOCUMENTS

| | | | | |
|---|---|---|---|---|
| 2,871,139 A * | 1/1959 | Wein | .............................. | 427/165 |
| 7,588,364 B2 * | 9/2009 | Kitamura et al. | ............. | 362/616 |
| 7,658,530 B2 * | 2/2010 | Liu | ................................ | 362/606 |
| 8,226,288 B2 * | 7/2012 | Yeh et al. | ....................... | 362/632 |
| 8,469,576 B2 * | 6/2013 | Kim | .............................. | 362/616 |
| 8,556,492 B2 * | 10/2013 | Joung et al. | .................... | 362/616 |
| 2005/0201120 A1 | 9/2005 | Nesterenko et al. | | |
| 2006/0262564 A1 * | 11/2006 | Baba | ............................. | 362/616 |
| 2007/0133227 A1 | 6/2007 | Kuo | | |
| 2007/0247871 A1 * | 10/2007 | Yoo | ................................ | 362/612 |

(Continued)

FOREIGN PATENT DOCUMENTS

| CN | 1760731 A | 4/2006 |
|---|---|---|
| CN | 101507002 A | 8/2009 |
| CN | 201318632 Y | 9/2009 |

(Continued)

OTHER PUBLICATIONS

3D TV War, Key-point is Image Quality, Apr. 28, 2010, 03 edition, http://news.donga.com/view.php?id=Print_Donga|3|20100427|27925489|1.

(Continued)

*Primary Examiner* — Sharon Payne
(74) *Attorney, Agent, or Firm* — Cantor Colburn LLP (57) ABSTRACT

A display apparatus includes plural light guide plates each including a light incident surface and a light output surface, plural light sources providing light to the light guide plates, and a display panel receiving the light to display an image. The light guide plates have a rectangular shape, are spaced apart from each other and are in a same plane. The light sources are disposed between two adjacent light guide plates. Each of the light sources includes a light emitting surface, and provides the light to the light guide plates through the light emitting surface. The light emitting surface of the light sources is inclined with respect to one side of the light guide plates.

20 Claims, 9 Drawing Sheets

(56) References Cited

U.S. PATENT DOCUMENTS

2008/0101068 A1    5/2008   Kitamura et al.
2010/0283718 A1   11/2010   Choi et al.

FOREIGN PATENT DOCUMENTS

| | | |
|---|---|---|
| CN | 101932968 A | 12/2010 |
| JP | 2004-241237 A | 8/2004 |
| JP | 2004-253354 A | 9/2004 |
| JP | 2010097909 | 4/2010 |
| KR | 1020040083891 | 10/2004 |
| KR | 1020070104149 | 10/2007 |
| KR | 1020080095428 A | 10/2008 |
| KR | 1020100109740 | 10/2010 |
| WO | 2009/110145 A1 | 9/2009 |
| WO | 2009/157351 A1 | 12/2009 |

OTHER PUBLICATIONS

Advance of LED TV . . . Hybrid LED TV, http://news.mk.co.kr/newsReadPrint.php?year=2009&no=451387, Date Aug. 26, 2009.

\* cited by examiner

DISPLAY APPARATUS

This application claims priority to Korean Patent Application No. 10-2011-0005566 filed on Jan. 19, 2011, and all the benefits accruing therefrom under 35 U.S.C. §119, the contents of which are herein incorporated by reference in its entirety.

BACKGROUND OF THE INVENTION

1. Field of the Invention

The invention relates to a display apparatus. More particularly, the invention relates to a display apparatus capable of improving a display quality thereof.

2. Description of the Related Art

In general, a display apparatus includes a backlight assembly that generates light, and a display panel that displays an image using the light. A display apparatus, which is driven in a local dimming method, has been developed in order to reduce power consumption in the backlight assembly and to improve a contrast ratio of the display panel.

According to the local dimming method, an amount of the light provided to the display panel is not uniform. That is, the amount of the light provided to the display panel depends on the image displayed on the display panel.

BRIEF SUMMARY OF THE INVENTION

Exemplary embodiments of the invention provide a display apparatus capable of improving a display quality thereof.

According to an exemplary embodiment, a display apparatus includes a plurality of light guide plates each including a light incident surface and a light output surface, a plurality of light sources providing light to the light guide plates, and a display panel receiving the light to display an image.

The light guide plates have a rectangular shape, and are in a same plane. The light sources are between two adjacent light guide plates. Each of the light sources includes a light emitting surface emitting the light, and provides the light to the light guide plates through the light emitting surface.

The light emitting surface is inclined with respect to one side of the light guide plates.

In an exemplary embodiment, the light sources include first light sources including the light emitting surfaces facing the first light incident surface, and second light sources including the light emitting surfaces facing the second light incident surface. The first light sources are alternately arranged with the second light sources. The light sources may be divided into a plurality of light emitting blocks that are driven independently from each other.

In an exemplary embodiment, the display panel includes a display area in which the image is displayed, and a non-display area in which the image is not displayed, the non-display area surrounding the display area. The light sources are positioned in the display area when viewed in a plan view.

According to another exemplary embodiment, a display apparatus includes a plurality of light guide plates. When one of two adjacent light guide plates among the light guide plates is referred to as a first light guide plate, and the other of the two adjacent light guide plates is referred to as a second light guide plate, the first light guide plate includes a first light incident surface, a first light output surface, and first protrusions protruded from the first light incident surface. In addition, the second light guide plate includes a second light incident surface facing the first light incident surface, a second light output surface, and second protrusions protruded from the second light incident surface. The first protrusions are alternately arranged with the second protrusions in a longitudinal direction of the first and second light incident surfaces.

According to the above, the display apparatus may perform a two-dimensional local dimming method, improve brightness uniformity, and reduce or effectively prevent dark areas and crosstalk, thereby improving display quality of the display apparatus.

BRIEF DESCRIPTION OF THE DRAWINGS

The above and other features of the invention will become readily apparent by reference to the following detailed description when considered in conjunction with the accompanying drawings wherein.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "under," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "lower" relative to other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
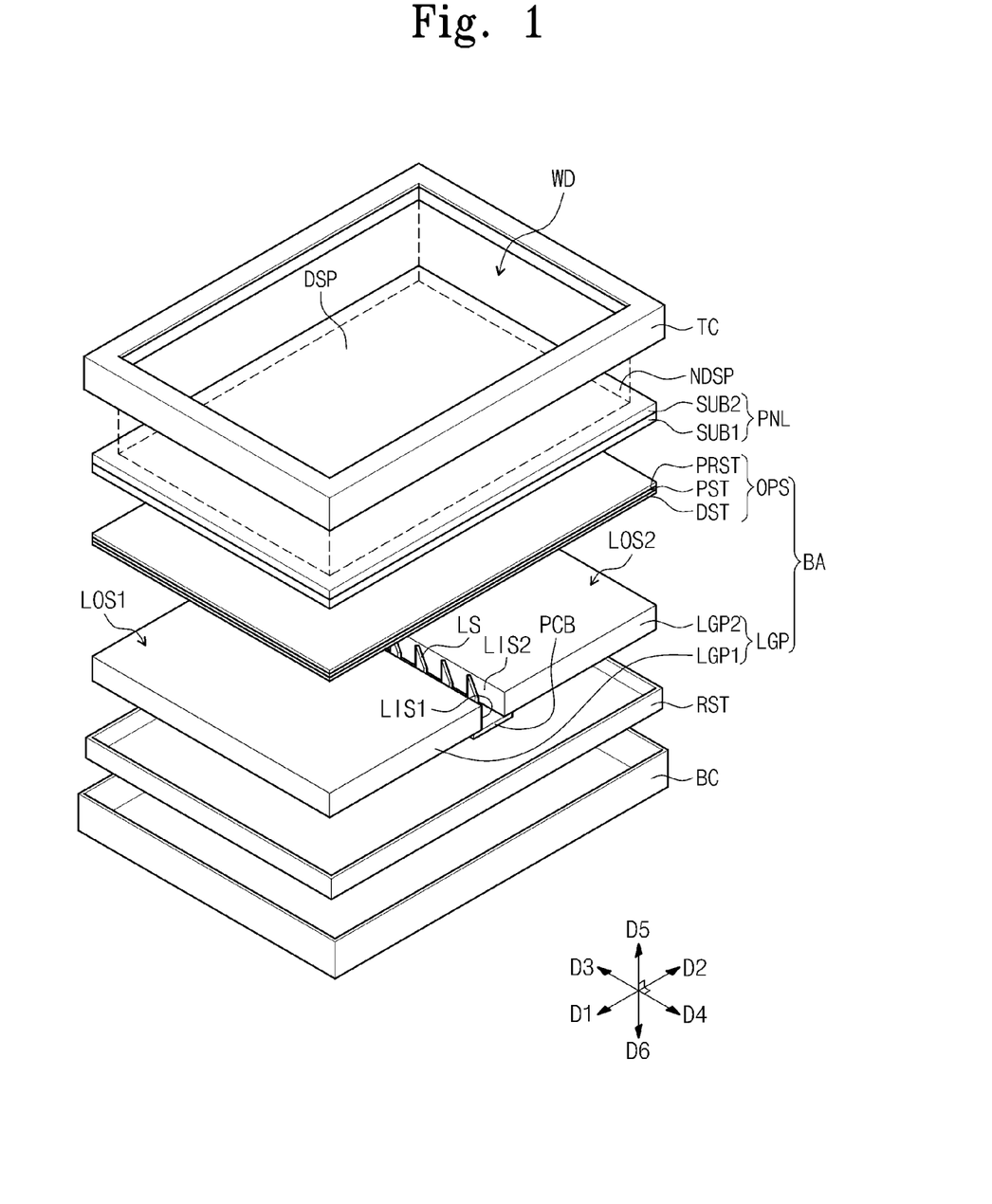
FIG. 1 is an exploded perspective view showing an exemplary embodiment of a display apparatus according to the invention.
Figure 2:
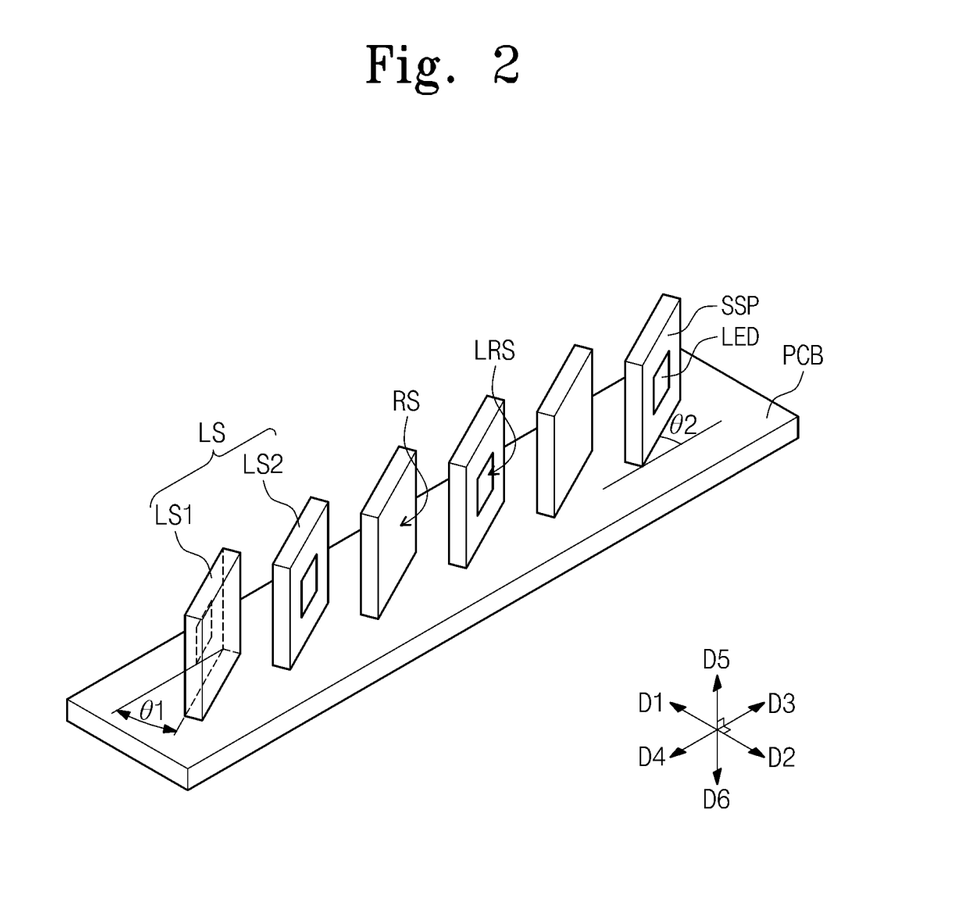
FIG. 2 is a perspective view showing an exemplary embodiment of a light source part of the display apparatus shown in FIG. 1.

FIG. 1 is an exploded perspective view showing an exemplary embodiment of a display apparatus according to the invention, and FIG. 2 is a perspective view showing an exemplary embodiment of a light source part of the display apparatus shown in FIG. 1.

Referring to FIG. 1, the display apparatus includes a display panel PNL, a backlight assembly BA, a bottom chassis BC, and a top chassis TC.

The display panel PNL displays an image. The display panel PNL is a light-receiving type display panel, such as a liquid crystal display panel, an electrophoretic display panel, etc. In the illustrated exemplary embodiment, the liquid crystal display panel will be described as a representative example.

The display panel PNL has a rectangular plate shape including two facing long sides, and two facing short sides perpendicular to the long sides. The display panel PNL includes a first substrate SUB1, a second substrate SUB2 facing the first substrate SUB1, and a liquid crystal layer (not shown) disposed between the first substrate SUB1 and the second substrate SUB2. When viewed in a plan view, the display panel PNL includes a display area DSP in which an image is displayed, and a non-display area NDSP in which the image is not displayed and surrounds the display area DSP. The non-display area NDSP is covered (e.g., overlapped) by a portion of the top chassis TC.

According to the illustrated exemplary embodiment, the first substrate SUB1 may include a plurality of pixel electrodes (not shown), and a plurality of thin film transistors (not shown) connected to the pixel electrodes, in a one-to-one correspondence. Each thin film transistor switches a driving signal applied to a corresponding pixel electrode of the pixel electrodes. In addition, the second substrate SUB2 may include a common electrode (not shown) that forms an electric field together with the pixel electrodes to control the arrangement of liquid crystal molecules in the liquid crystal layer. The display panel PNL drives the liquid crystal layer to display the image on a front (e.g., viewing) side of the display panel PNL.

For the convenience of explanation, in the illustrated exemplary embodiment, a direction in which the long sides of the display panel PNL are longitudinally extended is referred to as a first direction D1, a direction opposite to the first direction D1 is referred to as a second direction D2, a direction in which the short sides of the display panel PNL are longitudinally extended is referred to as a third direction D3, a direction opposite to the third direction D3 is referred to as a fourth direction D4, a direction in which the image is displayed is referred to as a fifth direction D5, and a direction opposite to the fifth direction D5 is referred to as a sixth direction D6.

The backlight assembly BA is provided under and overlapping the display panel PNL to provide light to the display panel PNL. The backlight assembly BA includes a light source part including a plurality of light sources LS generating and emitting the light, a plurality of light guide plates LGP guiding the light to the display panel PNL, a plurality of optical sheets OPS improving the efficiency of the light, and a reflection sheet RST changing an optical path of the light.

Referring to FIGS. 1 and 2, the light sources LS are disposed between a first light guide plate LGP1 and a second light guide plate LGP2, and provide the light used to display the image on the display panel PNL directly to the light guide plate LGP. The light sources LS are disposed on a printed circuit board PCB. The light source part is positioned in the display area DSP of the display panel PNL when viewed in the plan view.

The printed circuit board PCB supports the light sources LS and applies a power voltage to the light sources LS. The printed circuit board PCB may have a plate shape extended in a longitudinal direction according to the arrangement direction of the light sources LS mounted on the printed circuit board PCB. As shown in FIG. 2, the light sources LS are arranged in the third direction D3, the printed circuit board PCB may be longitudinally extended in the third direction D3.

According to the illustrated exemplary embodiment, the light source part includes the printed circuit board PCB and the light sources LS, but the invention is not limited thereto or thereby. That is, the printed circuit board PCB may be removed from the light source part, and thus a separate supporting member that supports the light sources LS and/or a separate wire that applies the power voltage to the light sources LS may be prepared.

As the light sources LS, various light sources, such as a point light source, a line light source, a surface light source, etc., may be used. In the illustrated exemplary embodiment, a light emitting diode ("LED") is used as the point light sources.

In FIGS. 1 and 2, the light sources LS arranged on the printed circuit board PCB in one line, e.g., in the third direction D3, has been shown.

Each light source LS includes a supporter SSP, and a light emitting device. The supporter SSP has a plate-like shape including a front surface, and a rear surface opposing the front surface. The supporter SSP may include a polymer insulating material such as epoxy resin, acrylic resin, etc., but the material is not limited thereto or thereby. The light emitting device may be the LED and may be mounted on the front surface of the supporter SSP. Each light source LS includes a light emitting surface LRS from which the light is emitted, and a rear surface RS opposite to the light emitting surface LRS. The light emitting surface LRS of each light source LS is the same as the front surface of the supporter SSP.

The light guide plates LGP are provided under and overlapping the display panel PNL to guide the light to the display panel PNL. Each light guide plate LGP has a rectangular plate-like shape when viewed in the plan view. Sides of each of the light guide plate LGP may be substantially parallel to the long sides and/or the short sides of the display panel PNL.

The light guide plates LGP may be provided in a quantity of at least two. The display apparatus according to the illustrated exemplary embodiment includes two light guide plates LGP. Another exemplary embodiment of the display apparatus according to the invention may include three light guide plates LGP or more. The light guide plates LGP may be arranged in one line along a specific direction or in a mosaic shape. In the case that the display apparatus includes three light guide plates or more, one light guide plate of two adjacent light guide plates is referred to as the first light guide plate LGP1 and the other light guide plate of the two adjacent light guide plates is referred to as the second light guide plate LGP2.

The first light guide plate LGP1 and the second light guide plate LGP2 are spaced apart from each other with the light sources LS therebetween. The first light guide plate LGP1 and the second light guide plate LGP2 are arranged in a same plane, and the plane is substantially parallel to one surface of the display panel PNL.

The first light guide plate LGP1 includes a first light incident surface LIS1 to which the light from the light sources LS is incident, and a first light output surface LOS1 from which the light is output. In the first light guide plate LGP1, the first light incident surface LIS1 faces the light sources LS, and the first light output surface LOS1 faces a rear surface of the display panel PNL.

The second light guide plate LGP2 includes a second light incident surface LIS2 to which the light from the light sources LS is incident, and a second light output surface LOS2 from which the light is output. The second light incident surface LIS2 faces the light sources LS, and the second light output surface LOS2 faces the rear surface of the display panel PNL. The first light incident surface LIS1 and the second light incident surface LIS2 face each other with the light sources LS therebetween.

The light incident from the light sources LS through the first light incident surface LIS1 is provided to the display panel PNL through the first light output surface LOS1 after being reflected or refracted several times in the first light guide plate LGP1. In addition, the light incident from the light sources LS through the second light incident surface LIS2 is provided to the display panel PNL through the second light output surface LOS2 after being reflected or refracted several times in the second light guide plate LGP2.

The light sources LS are arranged corresponding to the first and second light guide plates LGP1 and LGP2. The light sources LS include first light sources LS1, each of which includes the light emitting surface LRS toward the first light incident surface LIS1, and second light sources LS2, each of which includes the light emitting surface LRS toward the second light incident surface LIS2. The first light sources LS1 are inclinedly provided, so that the light emitting surfaces LRS of the first light sources LS1 have a first angle $\theta 1$ with respect to the first light incident surface LIS1. The second light sources LS2 are inclinedly provided, so that the light emitting surfaces LRS of the second light sources LS2 have a second angle $\theta 2$ with respect to the second light incident surface LIS2. The first light sources LS1 are alternately arranged with the second light sources LS2.

Each light source LS has an orientation angle $2\phi$ of a predetermined degree. The orientation angle $2\phi$ corresponds to a full width half maximum of an angular intensity distribution of a light amount in each light source LS. The orientation angle $2\phi$ may correspond to two times the angle at which the intensity of the light becomes 50 percent with reference to a straight line that is substantially perpendicular to the light emitting surface and crosses a center portion of the light emitting surface. The first angle $\theta 1$ and the second angle $\theta 2$ may be adjusted to allow the light in the orientation angle $2\phi$ of each light source LS to be incident to the light guide plate without light loss.

In an exemplary embodiment, for instance, in the case that the first light sources LS1 and the second light sources LS2 employ the same light sources LS having the same orientation angle, the first angle $\theta 1$ and the second angle $\theta 2$ may have a uniform value. In addition, the first angle $\theta 1$ and the second angle $\theta 2$ depend on the value of the orientation angle. Thus, in the case that the light sources LS are the LEDs having the orientation angle $2\phi$ of about 120 degrees to about 130 degrees, the first angle $\theta 1$ may be in a range greater than 0 degrees to equal to or smaller than about +65 degrees with reference to the first light incident surface LIS1, and the second angle $\theta 2$ may be in a range greater than 0 degrees to equal to or smaller than about +65 degrees, or in the range greater than 0 degrees to equal to or smaller than about −65 degrees with reference to the second light incident surface LIS2. According to one exemplary embodiment, the first angle $\theta 1$ may be about 50 degrees with reference to the first light incident surface LIS1, and the second angle $\theta 2$ may be about +50 degrees or −50 degrees with reference to the second light incident surface LIS2.

The optical sheet OPS is provided between the light guide plate LGP and the display panel PNL. The optical sheet OPS controls the light emitted from the light sources LS. The optical sheet OPS includes a diffusion sheet DST, a prism sheet PST, and a protection sheet PRST, which are sequentially stacked on the light guide plate LGP.

The diffusion sheet DST diffuses the light. The prism sheet PST collects the light diffused by the diffusion sheet DST such that the light travels in a direction substantially vertical to the surface of the display panel PNL. The light passing through the prism sheet PST is vertically incident to the display panel PNL. The protection sheet PRST is disposed on the prism sheet PST to protect the prism sheet PST from external impacts. In the illustrated exemplary embodiment, the optical sheet OPS including one diffusion sheet DST, one prism sheet PST, and one protection sheet PRST has been described, but the optical sheet OPS is not limited thereto or thereby. That is, at least one of the diffusion sheet DST, the prism sheet PST, and the protection sheet PRST may be provided in a plural numbers, or one or more of the diffusion sheet DST, the prism sheet PST, and the protection sheet PRST may be removed from the optical sheet OPS. In addition, the stacked order of the diffusion sheet DST, the prism sheet PST, and the protection sheet PRST may be changed.

The reflection sheet RST is provided under and overlapping the light guide plate LGP to reflect the light leaking downward from the light guide plate LGP such that the leaked light travels to the display panel PNL. The reflection sheet RST is disposed on the bottom chassis BC to reflect the light leaking from the light guide plate LGP. As a result, the amount of the light provided to the display panel PNL increases by the reflection sheet RST.

The top chassis TC is disposed on the display panel PNL. The top chassis TC supports an end portion of the front surface of the display panel PNL and covers a side surface of a mold frame (not shown) and/or a side surface of the bottom chassis BC. The top chassis TC is provided with a display window WD, which is formed by partially removing a portion of an upper surface of the top chassis TC, to expose the display area DSP of the display panel PNL.

The bottom chassis BC is provided at a lower portion of the backlight assembly BA to accommodate elements of the backlight assembly BA. The bottom chassis BC may include a bottom portion provided under the reflection sheet RST and substantially parallel to the rear surface of the reflection sheet RST, and a sidewall portion upwardly extended from the bottom portion. The backlight assembly BA is accommodated in a space defined by the bottom portion and the sidewall portion.

According to the illustrated exemplary embodiment, the display apparatus may reduce dark areas in the image displayed thereon. The light emitted from the light sources LS is not provided to the dark areas, or a relatively small amount of the light emitted from the light sources LS transmits through the dark areas. Thus, the image displayed on the display panel PNL in the areas is dark.

Figure 3A:
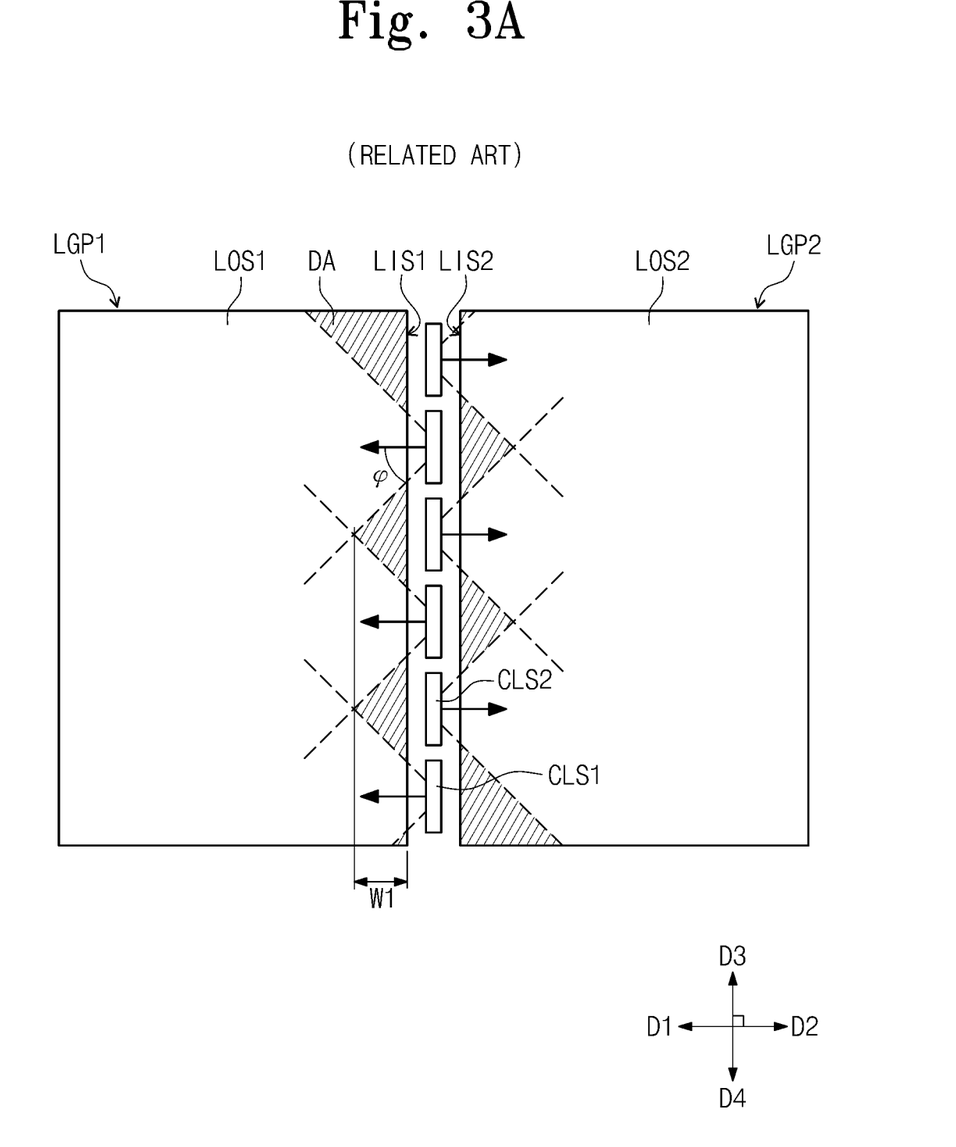
FIG. 3A is a plan view showing a light distribution according to arrangements of light guide plates and light sources in a conventional display apparatus.
Figure 3B:
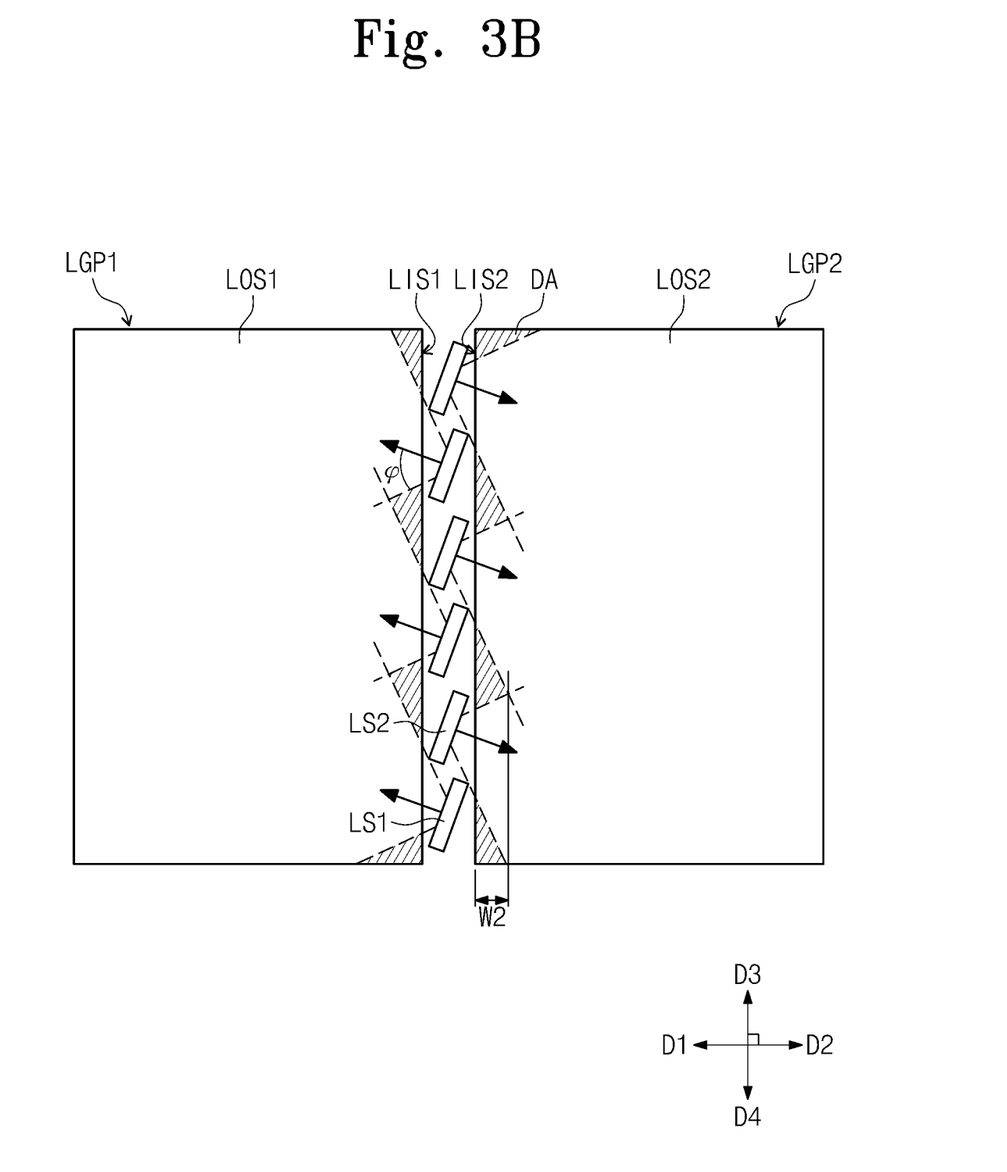
FIG. 3B is a plan view showing an exemplary embodiment of a light distribution apparatus according to arrangements of light guide plates and light sources of the display apparatus shown in FIG. 1.

FIG. 3A is a plan view showing a light distribution according to arrangements of first and second light guide plates and first and second light sources in a conventional display apparatus, and FIG. 3B is a plan view showing an exemplary embodiment of a light distribution apparatus according to arrangements of the first and second light guide plates LGP1 and LGP2 and the first and second light sources LS1 and LS2 of the display apparatus shown in FIG. 1.

In each of the first and second light sources LS1 and LS2, an angle $\phi$ at which the intensity of the light becomes 50 percent with reference to the straight line (line with arrowhead) that is substantially perpendicular to the light emitting surface and crosses the center portion of the light emitting surface has been indicated by a dotted line. The orientation angle of each of the first and second light sources LS1 and LS2 is $2\phi$.

Referring to FIG. 3A, the conventional display apparatus includes a first light guide plate LGP1 and a second light guide plate LGP2. The first light guide plate LGP1 includes the first light incident surface LIS1 and the first light output surface LOS1 and the second light guide plate LGP2 includes the second light incident surface LIS2 and the second light output surface LOS2.

The first and second light sources CLS1 and CLS2 are arranged in one straight line along a direction in which the first light incident surface LIS1 or the second light incident surface LIS2 is longitudinally extended. Since the first light incident surface LIS1 and the second light incident surface LIS2 are longitudinally extended in the third direction D3, the first and second light sources CLS1 and CLS2 are arranged along the third direction D3. The first light sources CLS1 face the first light incident surface LIS1 and the second light sources CLS2 face the second light incident surface LIS2. The first light sources CLS1 are alternately arranged with the second light sources CLS2 in the third direction D3. The light emitting surfaces of the first light sources CLS1 are substantially parallel to the first light incident surface LIS1, and the light emitting surfaces of the second light sources CLS2 are substantially parallel to the second light incident surface LIS2. Accordingly, the first light sources CLS1 emit the light to the first direction D1 and the second light sources CLS2 emit the light to the second direction D2.

Referring to FIGS. 3A and 3B, in the conventional display apparatus and the exemplary embodiment of the display apparatus according to the invention, since the light emitted from the light sources LS is provided to the light guide plates within the orientation angle of the first light sources CLS1 and LS1, and the second light sources CLS2 and LS2, e.g., the angle ($\pm\phi$) with reference to the straight line that is substantially perpendicular to the light emitting surface and crosses the center portion of the light emitting surface, the intensity of the light within the orientation angle of the first light sources CLS1 and LS1, and the second light sources CLS2 and LS2 is relatively higher than that in the range of the angle except for the orientation angle. However, since the light is not provided or the light is provided at a relatively low density in the range of the angle except for the orientation angle, the dark areas DA may occur by the light at the low density. The dark areas DA particularly occur between adjacent first light sources LS1, and between adjacent second light sources LS2, respectively, as shown in FIGS. 3A and 3B (hatched areas).

Referring to FIG. 3A, in the conventional display apparatus, each of the dark areas DA has a first width W1 in the first direction D1 or the second direction D2. Referring to FIG. 3B, in the exemplary embodiment of the display apparatus according to the invention, each of the dark areas DA has a second width W2 in the first direction D1 or the second direction D2.

In the conventional display apparatus, since the light emitting surfaces of the first light sources CLS1 are substantially parallel to the first light incident surface LIS1 and the light emitting surfaces of the second light sources CLS2 are substantially parallel to the second light incident surface LIS2, an overlap area between respective adjacent light sources CLS and an area out of the orientation area of the respective light sources CLS is relatively large and wide. In the exemplary embodiment of the display apparatus according to the invention, the first light sources LS1 are arranged to allow their light emitting surfaces LRS to be inclined with respect to the first light incident surface LIS1, and the second light sources LS2 are arranged to allow their light emitting surfaces LRS to be inclined with respect to the second light incident surface LIS2, such that an overlap area between adjacent respective light sources LS and an area out of the orientation area of the respective light sources LS is relatively small and narrow. That is, the second width W2 is smaller than the first width W1.

As described above, the exemplary embodiment of the display apparatus according to the invention may reduce the size of the dark areas DA, thereby displaying a uniform image thereon.

Figure 4:
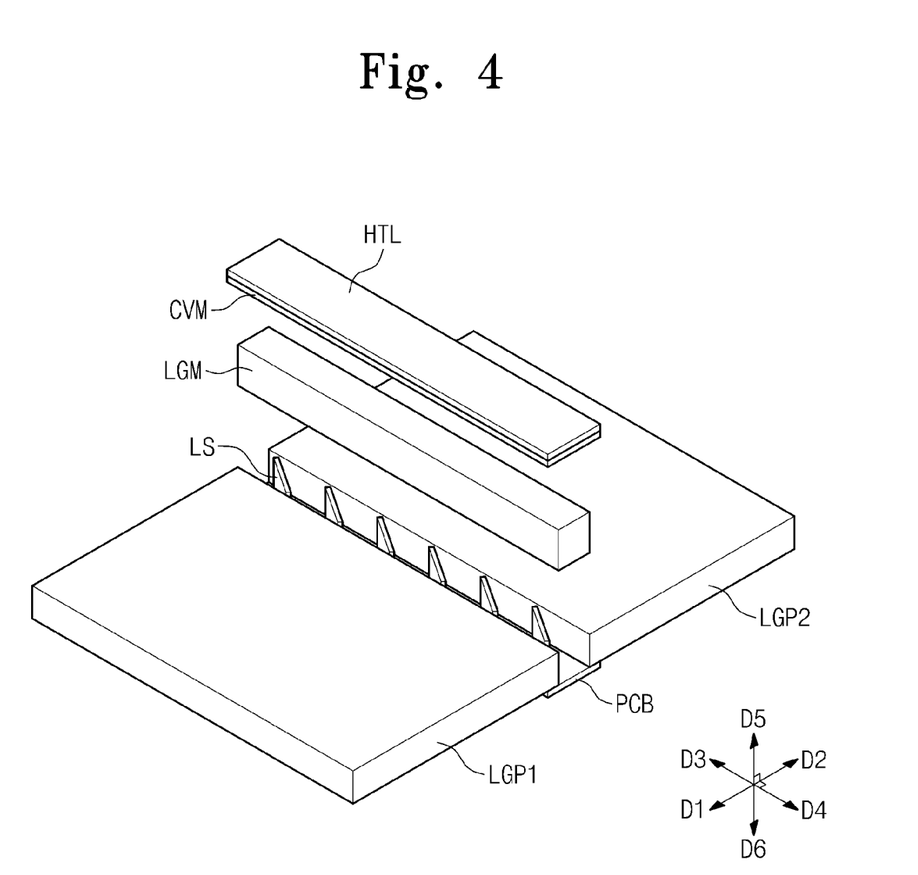
FIG. 4 is an exploded perspective view showing a portion of another exemplary embodiment of a display apparatus according to the invention.

FIG. 4 is an exploded perspective view showing a portion of another exemplary embodiment of a display apparatus according to the invention. In FIG. 4, the same reference numerals denote the same elements in FIG. 1, and thus detailed description of the same elements will be omitted.

Referring to FIGS. 1 and 4, the backlight assembly BA includes the light source part that includes the plurality of light sources LS to emit light, the plurality of light guide plates LGP that guides the light to the display panel PNL, a light guide member LGM provided between two adjacent light guide plates LGP to surround the light sources LS, the optical sheet OPS that improves the efficiency of the light, and the reflection sheet RST that changes an optical path of the light.

In FIG. 4, the light guide member LGM has a bar shape and is provided separate from the light sources LS. As the bar shape, the light guide member LGM is a relatively long, evenly shaped member. The light sources LS may be arranged inside the light guide member LGM. Where the light sources LS are inside of the light guide member LGM, portions of the light guide member LGM may be between the light sources LS and a respective light guide plate LGP. The light guide member LGM may be closely adjacent to or contacting the light sources LS, the first light guide plate LGP1, and the second light guide plate LGP2 to minimize the light leaking when the light guide member LGM guides the light to the first and second light guide plates LGP1 and LGP2 from the light sources LS.

The light guide member LGM may include a polymer resin, such as silicone, polyepoxy, polycarbonate, polymethylmethacrylate, etc., having heat resistance to heat generated by the light sources LS.

In an exemplary embodiment, the light guide member LGM is formed by preparing the polymer resin that is half-cured, supplying the half-cured polymer resin to an area between the first and second light guide plates LGP1 and LGP2, in which the light sources LS are arranged, and curing the half-cured polymer resin. Since the half-cured polymer resin has fluidity, the half-cured polymer resin may surround the light sources LS while being cured.

The light guide member LGM has a refractive index equal to or similar to that of the first and second light guide plates LGP1 and LGP2. As the refractive index of the light guide member LGM becomes close to the refractive index of the first and second light guide plates LGP1 and LGP2, the amount of the light incident to the light incident surfaces LIS1 and LIS2 of the first and second light guide plates LGP1 and LGP2 from the light guide member LGM increases. In this case, the amount of light increases because the refracted degree of the light and the frequency of the reflected light are reduced as a refractive index difference between two materials becomes small.

A cover member CVM may be provided on the light guide member LGM. The cover member CVM is connected with the light guide member LGM and overlapped with portions of the light output surfaces LOS1 and LOS2 of the first and second light guide plates LGP1 and LGP2 adjacent to each other. The cover member CVM has a plate-like shape and is longitudinally extended in the direction in which the light sources LS are arranged.

The cover member CVM covers a portion of the first light guide plate LGP1, and a portion of the second light guide plate LGP2 which faces the portion of the first light guide plate LGP1. Thus, a portion of the light output surface LOS1 of the first light guide plate LGP1 and a portion of the light output surface LOS2 of the second light guide plate LGP2 are covered by the cover member CVM. In FIG. 4, the cover member CVM has been shown as a separate element from the light guide member LGM, but the invention is not limited thereto. In an alternative exemplary embodiment, the cover member CVM may be integrally formed with the light guide member LGM. In detail, the integral cover member CVM and light guide member LGM may be formed using a single material through a single process, such that the cover member CVM and the light guide member LGM are a single, unitary, indivisible element.

The cover member CVM may reduce or effectively prevent the light guide plates LGP from moving freely. The light guide plates LGP may be moved in all directions by external impacts, or expanded by the heat continuously provided from the light sources LS, so the light guide plates LGP may be deviated from an original position. The cover member CVM overlapping the area between the first and second light guide plates LGP1 and LGP2 holds positions of the first and second light guide plates LGP1 and LGP2.

A half-transmission layer HTL may be provided on the cover member CVM to cover the cover member CVM. The half-transmission layer HTL is provided to be substantially parallel to the light output surfaces of the light guide plates. The half-transmission layer HTL transmits a portion of the light emitted from the light sources LS and reflects a portion of the light emitted from the light sources LS. In this case, the half-transmission layer HTL may be a metal layer such that the light is specularly reflected. The reflectivity or the specular reflection of the light may be controlled by adjusting a thickness of the metal layer and a material of the metal layer when the metal layer is formed. The metal layer may include silver, aluminum, or an alloy thereof.

Since the first light guide plate LGP1 and the second light guide plate LGP2 are spaced apart from each other by the light sources LS, the light emitted from the light sources LS may travel in a vertical upward direction passing through the space between the first and second light guide plates LGP1 and LGP2 without being incident directly to the first and second light guide plates LGP1 and LGP2. Accordingly, a bright line may occur at the area between the first and second light guide plates LGP1 and LGP2, thereby causing deterioration in brightness of the display panel PNL. The half-transmission layer HTL reflects a portion of the light traveling in the vertical upward direction to reduce or effectively prevent the bright line from occurring, and transmits a portion of the light traveling in the vertical upward direction to prevent the dark areas DA from being generated.

Figure 5:
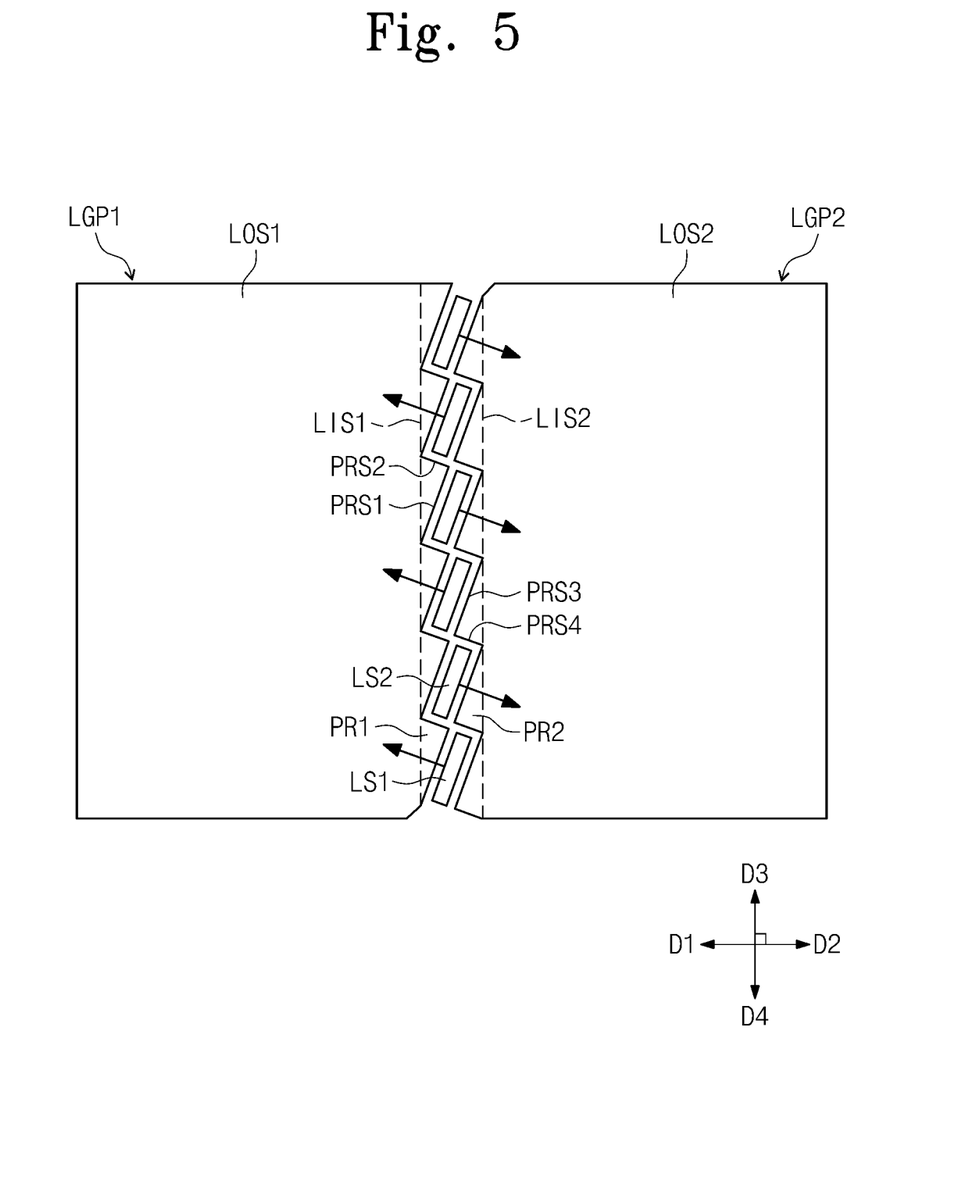
FIG. 5 is a plan view showing another exemplary embodiment of light sources and light guide plates of a display apparatus according to the invention.

FIG. 5 is a plan view showing another exemplary embodiment of light sources and light guide plates of a display apparatus according to the invention. In FIG. 5, the same reference numerals denote the same elements in FIGS. 1 and 3B, and thus detailed descriptions of the same elements will be omitted.

Referring to FIG. 5, the exemplary embodiment of a display apparatus includes the first light guide plate LGP1 and the second light guide plate LGP2. The first and second light guide plates LGP1 and LGP2 are spaced apart from each other with the light sources LS therebetween.

The light sources LS include first light sources LS1, each of which includes the light emitting surface LRS toward the first light incident surface LIS1 (dotted line), and second light sources LS2, each of which includes the light emitting surface LRS toward the second incident surface LIS2 (dotted line).

When viewed in the plan view, the first light sources LS1 are inclinedly provided such that the light emitting surfaces LRS of the first light sources LS1 have a predetermined angle with respect to the third direction D3 in which the first light incident surface LIS1 extends, and the second light sources LS2 are inclinedly provided, so that the light emitting surfaces LRS of the second light sources LS2 have a predetermined angle with respect to the third direction D3 in which the second light incident surface LIS2 extends.

The first light sources LS1 are alternately arranged with the second light sources LS2, and the angle of the first light sources LS1 with respect to the first light incident surface LIS1 may be the same as the angle of the second light sources LS2 with respect to the second light incident surface LIS2.

Each of the first light guide plate LGP1 and the second light guide plate LGP2 may have a rectangular-like shape including two facing long sides and two facing short sides perpendicular to the long sides. The first light guide plate LGP1 includes the first light incident surface LIS1 to which the light from the light sources LS is incident, the first light output surface LOS1 from which the light is output, and a first protrusion PR1 protruded from the first light incident surface LIS1. The first light incident surface LIS1 of the first light guide plate LGP1 is an imaginary surface corresponding to one of the long and short sides, which faces the light sources LS. The second light guide plate LGP2 includes the second light incident surface LIS2 to which the light from the light sources LS is incident, the second light output surface LOS2 from which the light is output, and a second protrusion PR2 protruded from the second light incident surface LIS2. The second light incident surface LIS1 of the second light guide plate LGP2 is an imaginary surface corresponding to one of the long and short sides, which faces the light sources LS.

Each of the first protrusion PR1 and the second protrusion PR2 may be provided in a singular number or in a plural number, and hereinafter the first and second protrusions PR1 and PR2 will be described on the assumption that each of the first and second protrusions PR1 and PR2 is provided in the plural number. The first protrusions PR1 are alternately arranged with the second protrusions PR2 along the longitudinal direction of the first and second light incident surfaces LIS1 and LIS2, e.g., the third direction D3.

Each of the first protrusions PR1 includes a first side surface PRS1 inclined to the first light incident surface LIS1, and a second side surface PRS2 inclined to the first light incident surface LIS1 and connecting the first side surface PRS1 to the first light incident surface LIS1. An angle between the first side surface PRS1 and the first light incident surface LIS1 is different from an angle between the second side surface PRS2 and the first light incident surface LIS1. The first side surfaces PRS1 are arranged to face the light emitting surfaces LRS of the first light sources LS1 in a one-to-one correspondence, and the first side surface PRS1 is substantially parallel to the light emitting surface LRS of the first light source LS1.

Each of the second protrusions PR2 includes a third side surface PRS3 inclined to the second light incident surface LIS2, and a fourth side surface PRS4 inclined to the second light incident surface LIS2 and connecting the third side surface PRS3 to the second light incident surface LIS2. An angle between the third side surface PRS3 and the second light incident surface LIS2 is different from an angle between the fourth side surface PRS4 and the second light incident surface LIS2. The third side surfaces PRS3 are arranged to face the light emitting surfaces LRS of the second light sources LS2 in a one-to-one correspondence, and the third side surface PRS3 is substantially parallel to the light emitting surface LRS of the second light source LS2.

In the illustrated exemplary embodiment, the first to fourth side surfaces PRS1, PRS2, PRS3, and PRS4 are spaced apart from the light sources LS, but the first to fourth side surfaces PRS1, PRS2, PRS3, and PRS4 may make contact with the light sources LS in an alternative embodiment. The first and third side surfaces PRS1 and PRS3 define a plurality of discontinuous surfaces of the first and second light guide plates LGP1 and LGP2, respectively, on which light is incident from the light sources LS, compared to the single continuous surface illustrated in the earlier exemplary embodiments. Where the first and second light incident surfaces LIS1 and LIS2 may be considered as light incident main surfaces, the first to fourth side surfaces PRS1, PRS2, PRS3, and PRS4 may be considered as light incident sub-surfaces.

In the above-described structure, the light emitted through the light emitting surfaces LRS of the first light sources LS1 is vertically (e.g., perpendicularly) incident into the first side surface PRS1, and the light emitted through the light emitting surfaces LRS of the second light sources LS2 is vertically incident into the third side surface PRS3, as illustrated by the lines having an arrowhead. Thus, the amount of the light incident into the light guide plates LGP may be increased compared to when the light emitted from the light sources LS is incident into the first and second light guide plates LGP1 and LGP2 while being inclined with respect to a single surface of the first and second light guide plates LGP1 and LGP2.

The arrangement of the light sources and the shape of the protrusions is not limited to the above-mentioned arrangement and shape.

Figure 6:
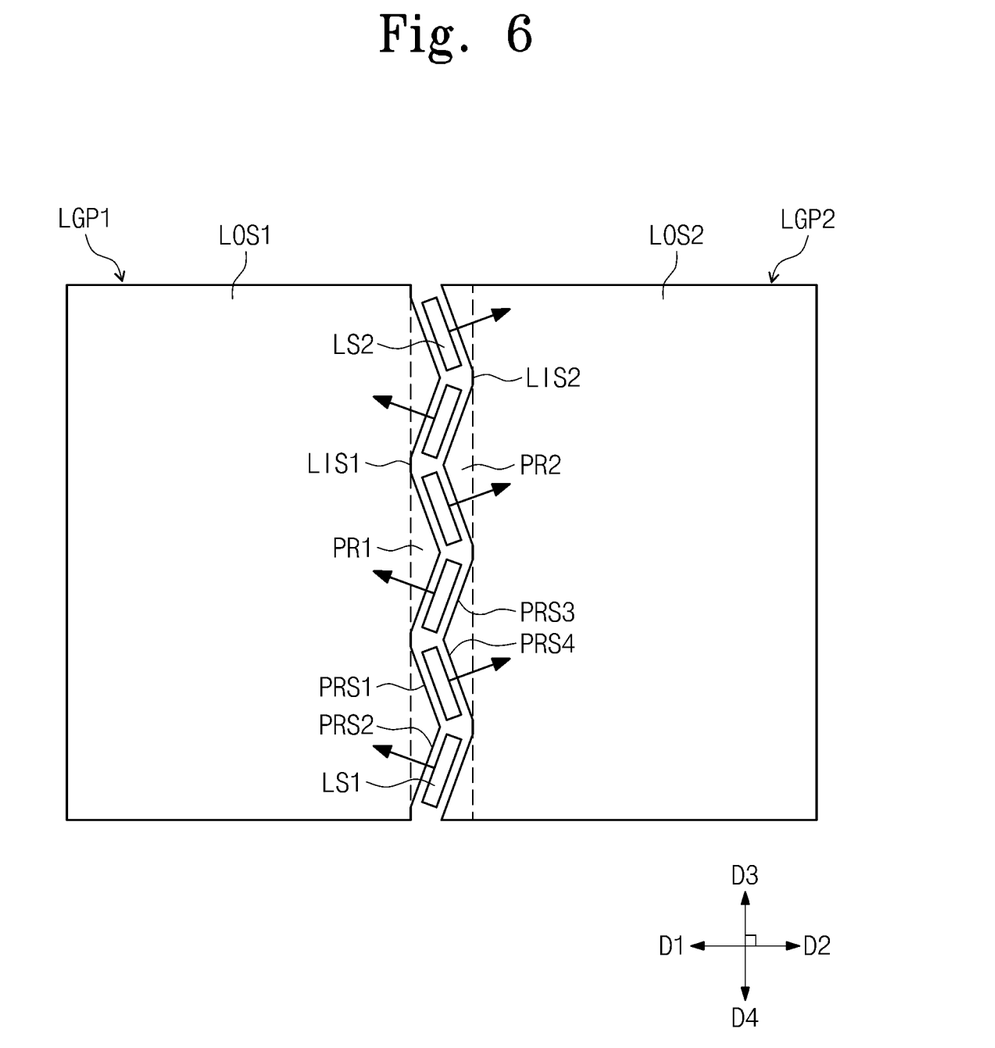
FIG. 6 is a plan view showing another exemplary embodiment of light sources and light guide plates of a display apparatus according to the invention.

FIG. 6 is a plan view showing another exemplary embodiment of light sources and light guide plates of a display apparatus according to the invention. In detail, FIG. 6 shows protrusions different from those in FIG. 5. In FIG. 6, the same reference numerals denote the same elements in FIGS. 1 and 5, and thus detailed description of the same elements will be omitted in order to avoid redundancy.

Referring to FIG. 6, the exemplary embodiment of a display apparatus includes the first light guide plate LGP1 and the second light guide plate LGP2. The first light guide plate LGP1 and the second light guide plate LGP2 are spaced apart from each other with the light guide part therebetween.

The light sources LS includes first light sources LS1 including light emitting surfaces LRS toward the first light incident surface LIS1 (dotted line), and second light sources LS2 including light emitting surfaces LRS toward the second light incident surface LIS2 (dotted line).

When viewed in the plan view, the first light sources LS1 are inclinedly provided, so that the light emitting surfaces LRS of the first light sources LS1 have a predetermined angle with respect to the third direction D3 in which the first light incident surface LIS1 extends. The second light sources LS2 are inclinedly provided, so that the light emitting surfaces of the second light sources LS2 have a predetermined angle with respect to the third direction D3 in which the second light incident surface LIS2 extends. The first light sources LS1 are alternately arranged with the second light sources LS2, and the angle of the first light sources LS1 with respect to the first light incident surface LIS1 may be different from the angle of the second light sources LS2 with respect to the second light incident surface LIS2.

Each of the first light guide plate LGP1 and the second light guide plate LGP2 may have a rectangular-like shape including two facing long sides and two facing short sides perpendicular to the long sides when viewed in the plan view. The first light guide plate LGP1 includes the first light incident surface LIS1 to which the light from the light sources LS is incident, the first light output surface LOS1 from which the light is output, and the first protrusion PR1 protruded from the first light incident surface LIS1. The first light incident surface LIS1 of the first light guide plate LGP1 is an imaginary surface corresponding to the long sides or the short sides, which faces the light sources LS. The second light guide plate LGP2 includes the second light incident surface LIS2 to which the light from the light sources LS is incident, the second light output surface LOS2 from which the light is output, and the second protrusion PR2 protruded from the second light incident surface LIS2. The second light incident surface LIS1 of the second light guide plate LGP2 is an imaginary surface corresponding to the long sides or the short sides, which faces the light sources LS.

Each of the first protrusion PR1 and the second protrusion PR2 may be provided in a singular number or in a plural number, and hereinafter the first and second protrusions PR1 and PR2 will be described on the assumption that each of the first and second protrusions PR1 and PR2 is provided in the plural number. The first protrusions PR1 are alternately arranged with the second protrusions PR2 along the longitudinal direction of the first and second light incident surfaces LIS1 and LIS2, e.g., the third direction D3.

Each of the first protrusions PR1 includes the first side surface PRS1 inclined to the first light incident surface LIS1, and the second side surface PRS2 inclined to the first light incident surface LIS1 and connecting a first end of the first side surface PRS1 to the first light incident surface LIS1. A second end of the first side surface PRS1 may directly meet the first light incident surface LIS1 at a non-inclined portion of the first light incident surface LIS1. The non-inclined portion may be between the first side surface PRS1 and an adjacent first protrusion PR1 second side surface PR2. An angle between the first side surface PRS1 and the first light incident surface LIS1 is equal to an angle between the second side surface PRS2 and the first light incident surface LIS1. The second side surfaces PRS2 are arranged to face the light emitting surface LRS of a corresponding light source LS of the first light sources LS1 in a one-to-one correspondence, and the second side surfaces PRS2 are substantially parallel to the light emitting surface LRS of the corresponding light source LS of the first light sources LS1.

Each of the second protrusions PR2 includes a third side surface PRS3 inclined to the second light incident surface LIS2, and a fourth side surface PRS4 inclined to the second light incident surface LIS2 and connecting the third side surface PRS3 to the second light incident surface LIS2. An angle between the third side surface PRS3 and the second light incident surface LIS2 is equal to an angle between the fourth side surface PRS4 and the second light incident surface LIS2. The fourth side surfaces PRS4 are arranged to face the light emitting surface LRS of a corresponding light source LS of the second light sources LS2 in a one-to-one correspondence, and the fourth side surfaces PRS4 are substantially parallel to the light emitting surface LRS of the corresponding light source LS of the second light source LS2.

According to the illustrated exemplary embodiment, the distance between the first light incident surface LIS1 and the second light incident surface LIS2 may be minimized, and at least one light source of the light sources LS may be arranged corresponding to every side surface PRS1, PRS2, PRS3 and PRS4 of the first and second protrusions PR1 and PR2. As a result, the amount of the light incident into the first and second light incident surfaces LIS1 and LIS2 may be increased.

Figure 7:
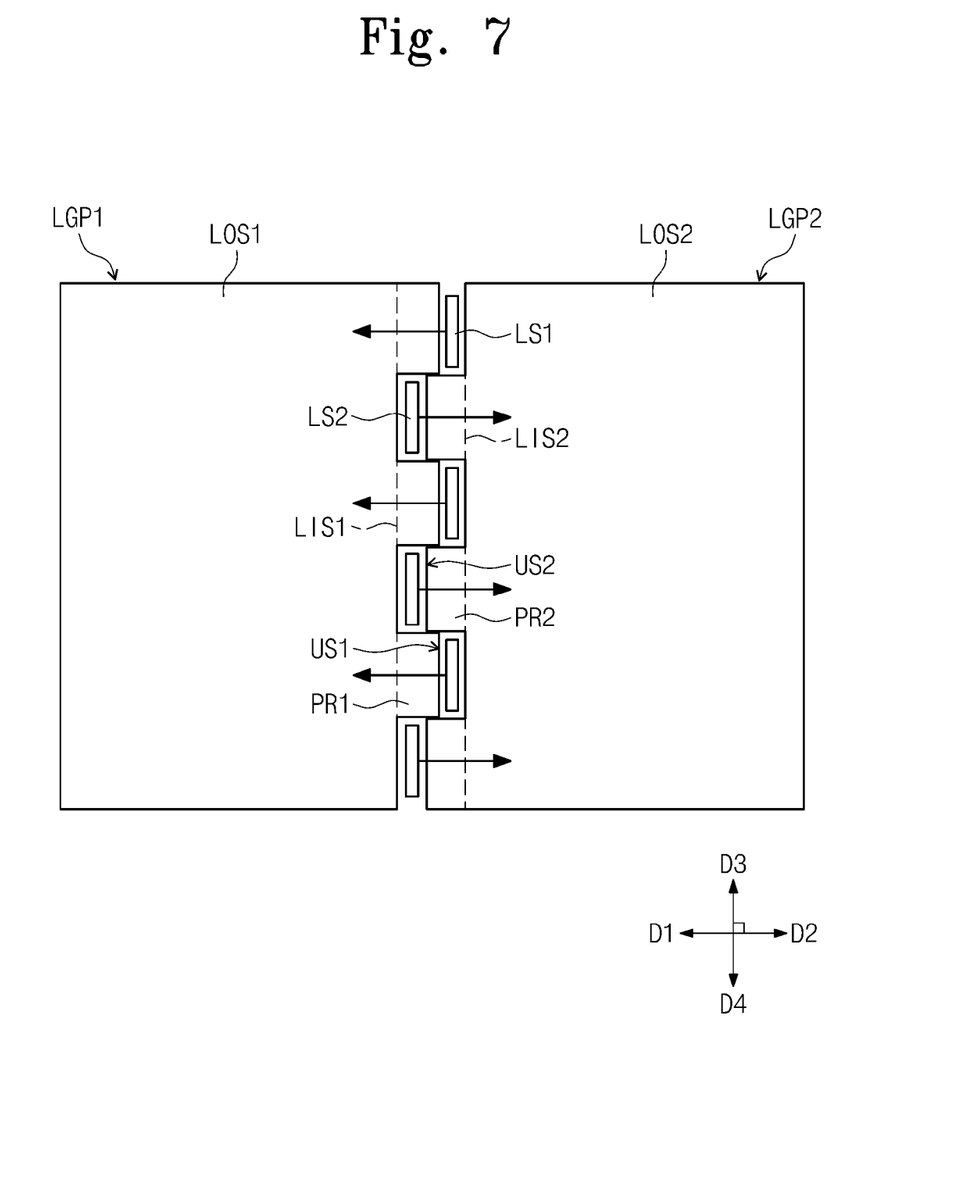
FIG. 7 is a plan view showing another exemplary embodiment of light sources and light guide plates of a display apparatus according to the invention.

FIG. 7 is a plan view showing another exemplary embodiment of light sources and light guide plates of a display apparatus according to the invention. In detail, FIG. 7 shows protrusions different from those in FIGS. 5 and 6. In FIG. 7, the same reference numerals denote the same elements in FIGS. 1 and 5, and thus detailed description of the same elements will be omitted in order to avoid redundancy.

Referring to FIG. 7, the exemplary embodiment of a display apparatus includes the first light guide plate LGP1 and the second light guide plate LGP2. The first light guide plate LGP1 and the second light guide plate LGP2 are spaced apart from each other with the light guide part therebetween.

Each of the first light guide plate LGP1 and the second light guide plate LGP2 may have a rectangular-like shape including two facing long sides, and two facing short sides perpendicular to the long sides when viewed in the plan view. The first light guide plate LGP1 includes the first light incident surface LIS1 to which the light from the light sources LS is incident, the first light output surface LOS1 from which the light is output, and the first protrusion PR1 protruded from the first light incident surface LIS1. The first light incident surface LIS1 of the first light guide plate LGP1 is an imaginary surface corresponding to the long sides or the short sides, which faces the light sources LS. The second light guide plate LGP2 includes the second light incident surface LIS2 to which the light from the light sources LS is incident, the second light output surface LOS2 from which the light is output, and the second protrusion PR2 protruded from the second light incident surface LIS2. The second light incident surface LIS2 of the second light guide plate LGP2 is an imaginary surface corresponding to the long sides or the short sides, which faces the light sources LS.

Each of the first protrusion PR1 and the second protrusion PR2 may be provided in a singular number or in a plural number, and hereinafter the first and second protrusions PR1 and PR2 will be described on the assumption that each of the first and second protrusions PR1 and PR2 is provided in the plural number. The first protrusions PR1 are alternately arranged with the second protrusions PR2 along the longitudinal direction of the first and second light incident surfaces LIS1 and LIS2, e.g., the third direction D3.

The first protrusions PR1 include first upper surfaces US1 substantially parallel to the first light incident surface LIS1, and the second protrusions PR2 include second upper surfaces US2 substantially parallel to the second light incident surface LIS2.

The light sources LS include first light sources LS1 including light emitting surfaces LRS toward the first light incident surface LIS1, and second light sources LS2 including light emitting surfaces LRS toward the second light incident surface LIS2. The light emitting surfaces LRS of the first light sources LS1 correspond to the first upper surfaces US1 in a one-to-one correspondence, and the light emitting surfaces LRS of the second light sources LS2 correspond to the second upper surfaces US2 in a one-to-one correspondence. In addition, the first light sources LS1 are arranged along the third direction D3 to be substantially parallel to the first upper surfaces US1, and the second light sources LS2 are arranged along the third direction D3 to be substantially parallel to the second upper surfaces US2. The first light sources LS1 and the second light sources LS2 are not arranged in the same line when viewed in the first and third directions D1 and D3.

As described above, in the exemplary embodiments of FIGS. 5 to 7, the first protrusions PR1 and the second protrusions PR2 fill the space between the first light incident surface LIS1 and the light sources LS, and between the second light incident surface LIS2 and the light sources LS. In addition, the first light sources LS1 are alternately arranged with the second light sources LS2 along the third direction D3, thereby reducing the dark areas.

Figure 8:
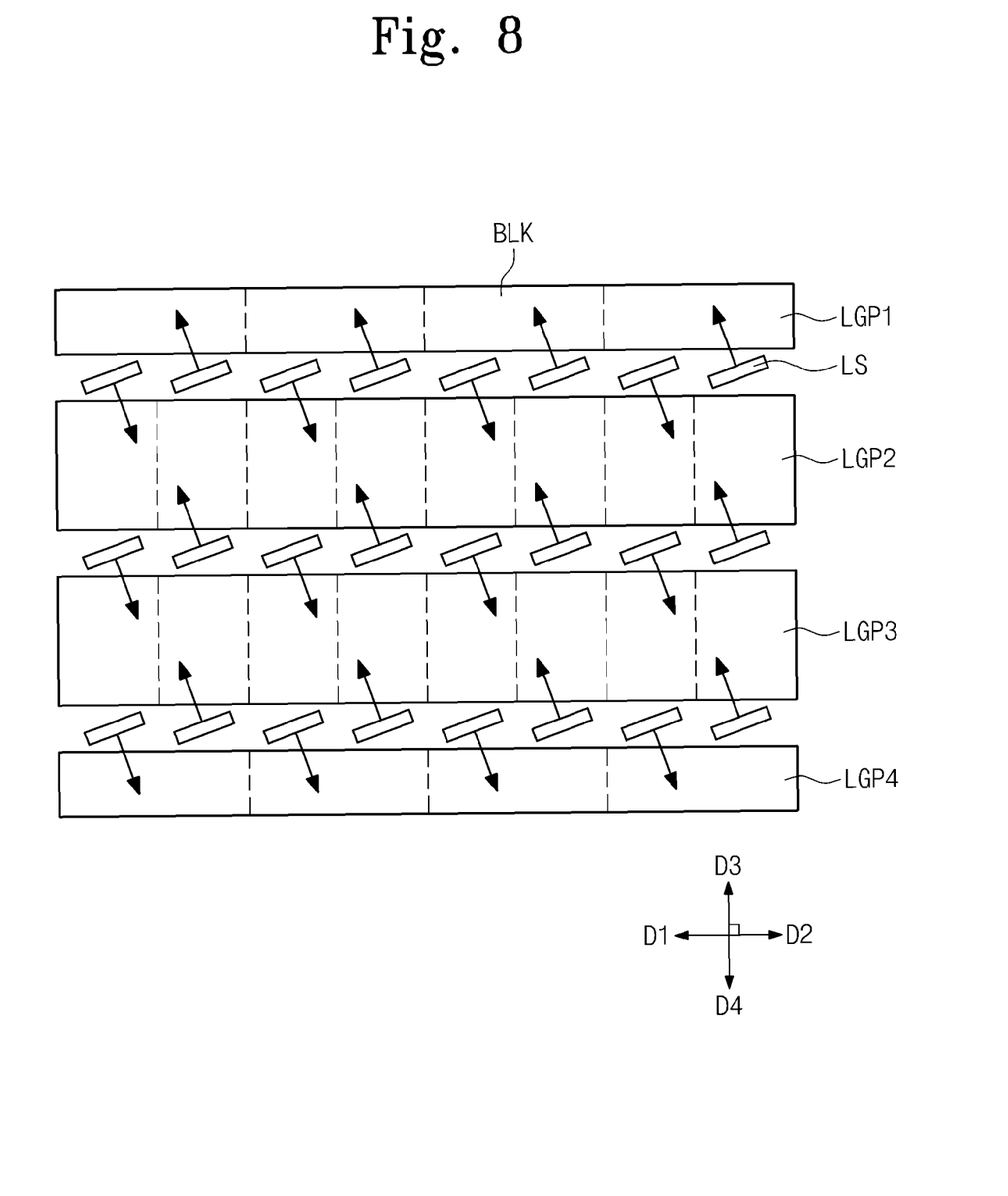
FIG. 8 is a plan view showing another exemplary embodiment of light sources and light guide plates of a display apparatus according to the invention.

FIG. 8 is a plan view showing another exemplary embodiment of light sources and light guide plates of a display apparatus according to the invention. In detail, FIG. 8 shows only different parts and elements from those of the exemplary embodiment in FIGS. 2 and 3B, and thus the description of the same or similar parts will be omitted in order to avoid redundancy.

The exemplary embodiment of a display apparatus includes the plurality of light guide plates LGP. The light guide plates may include first, second, third, and fourth light guide plates LGP1, LGP2, LGP3, and LGP4. As shown in FIG. 8, at least one of the first and fourth light guide plates LGP1, LGP2, LGP3, and LGP4 may have a different size from the rest, or the first and fourth light guide plates LGP1, LGP2, LGP3, and LGP4 may have the same size. The size may be defined by dimensions taken in the first and second directions D1 and D2, and/or by dimensions taken in the third and fourth directions D3 and D4. Each of the first to fourth light guide plates LGP1, LGP2, LGP3, and LGP4 has a rectangular-like planar shape including two facing long sides, and two facing short sides perpendicular to the long sides. In addition, the first to fourth light guide plates LGP1, LGP2, LGP3, and LGP4 may be arranged in various orders. In the illustrated exemplary embodiment, the first to fourth light guide plates LGP1, LGP2, LGP3, and LGP4 have the long sides extended in the first direction D1, and are arranged in the third direction D3 in that order.

Light sources LS are arranged between two adjacent light guide plates among the first to fourth light guide plates LGP1, LGP2, LGP3, and LGP4, so as to permit the light emitting surfaces of the light sources LS to be inclined to the extended direction of the first to fourth light guide plates LGP1, LGP2, LGP3, and LGP4.

The first to fourth light guide plates LGP1, LGP2, LGP3, and LGP4 may be divided into a plurality of light emitting blocks BLK arranged in the third direction D3, and in the first direction D1 substantially perpendicular to the third direction D3. The light emitting blocks BLK correspond to individual ones of the light sources LS, respectively, and thus the light emitting blocks BLK may be driven independently from each other. Alternatively, when assuming that the light sources LS are divided into plural groups of individual light sources LS, the light emitting blocks BLK may be independently driven from each other to correspond to the light source groups in a one-to-one correspondence. As described above, the light emitting blocks BLK may be arranged in a two-dimensional pattern and may be driven independently, thereby easily providing a two-dimensional local dimming method. As a result, a color separation between black and white colors may be easily obtained by controlling the turn-on and turn-off of the light sources LS, to thereby reduce the power consumption and the heat generation of the light sources LS.

According to the exemplary embodiments, the light may be uniformly provided to an entire surface of the display panel without forming the dark areas, thereby improving brightness uniformity of the display apparatus.

Since the light sources are not disposed in the non-display area of the display panel, the non-display area may be minimized. That is, according to the exemplary embodiments, all the light sources are disposed in the display area, and thus a temperature along the entire surface of the display panel is uniformly maintained so as to maintain the reaction speed of the liquid crystals at a constant level.

In addition, the light sources are turned on or turned off in response to a driving signal applied to each pixel, and thus the display panel may be scanned in one direction. In the scanning process, the light sources, which correspond to areas not applied with the driving signal, are maintained in the turned-off state so as to remove after images in the areas not applied with the driving signal, thereby reducing or effectively preventing occurrence of crosstalk.

Although the exemplary embodiments of the invention have been described, it is understood that the invention is not limited to these exemplary embodiments but various changes and modifications can be made by one ordinary skilled in the art within the spirit and scope of the invention as hereinafter claimed.

What is claimed is:

1. A display apparatus comprising:
two light guide plates adjacent in a same plane, each of the two light guide plates having a rectangular shape;
a plurality of light sources between the two adjacent same-plane light guide plates, in a same plane in which the two light guide plates are adjacent, each of the light sources comprising a light emitting surface in the same plane in which the two light guide plates are adjacent and through which light is emitted to the two adjacent same-plane light guide plates; and
a display panel receiving the light and displaying an image with the light,
wherein when one of the two adjacent same-plane light guide plates is referred to as a first light guide plate, and the other of the two adjacent same-plane light guide plates is referred to as a second light guide plate,
the first light guide plate includes a first single-plane light incident surface in the same plane in which the two light guide plates are adjacent, and a first light output surface, and
the second light guide plate includes a second single-plane light incident surface in the same plane in which the two light guide plates are adjacent, the second single-plane light incident surface facing the first single-plane light incident surface with the plurality of light sources therebetween, and a second light output surface, and
wherein in a top plan view of the output surfaces of the two adjacent same-plane light guide plates between which the plurality of light sources is disposed, the light emitting surfaces in the same plane in which the two light guide plates are adjacent are inclined with respect to both of the first and second single-plane light incident surfaces between which the plurality of light sources is disposed in the same plane in which the two light guide plates are adjacent.

2. The display apparatus of claim 1, wherein the light sources further comprise:
first light sources including the light emitting surfaces facing the first single-plane light incident surface, and second light sources including the light emitting surfaces facing the second single-plane light incident surface, and
the first light sources alternate with the second light sources.

3. The display apparatus of claim 2, wherein
an angle between the first single-plane light incident surface and the light emitting surface of each first light source among the first light sources, is the same; and
an angle between the second single-plane light incident surface and the light emitting surface of each second light source among the second light sources, is the same.

4. The display apparatus of claim 1, further comprising a light guide member between the two adjacent light guide plates, wherein the light guide member surrounds the light sources, guides the light to the first and second light guide plates, and includes a cured polymer resin.

5. The display apparatus of claim 4, further comprising a cover member connected to the light guide member, and overlapped with a portion of the light output surfaces of the two adjacent light guide plates.

6. The display apparatus of claim 5, further comprising a half-transmission layer substantially parallel to the light output surfaces and covering the cover member.

7. The display apparatus of claim 6, wherein the half-transmission layer is a metal layer.

8. The display apparatus of claim 1, wherein
the display panel comprises a display area in which the image is displayed, and a non-display area in which the image is not displayed, the non-display area surrounding the display area, and
the light sources are in the display area when viewed in the top plan view.

9. The display apparatus of claim 1, wherein the light sources are divided into a plurality of light emitting blocks which are driven independently from each other.

10. A display apparatus comprising:
two light guide plates adjacent in a same plane;
a plurality of light sources between the two adjacent same-plane light guide plates, in a same plane in which the two light guide plates are adjacent, each of the light sources comprising a light emitting surface in the same plane in which the two light guide plates are adjacent and through which a light is emitted the two adjacent same-plane light guide plates; and
a display panel receiving the light and displaying an image with the light,
wherein when one of the two adjacent same-plane light guide plates is referred to as a first light guide plate, and the other of the two adjacent same-plane light guide plates is referred to as a second light guide plate,
the first light guide plate includes:
a first single-plane light incident surface in the same plane in which the two light guide plates are adjacent,
a first light output surface, and
first protrusions protruded in the same plane in which the two light guide plates are adjacent from the first single-plane light incident surface, the second light guide plate includes:
a second single-plane light incident surface in the same plane in which the two light guide plates are adjacent, the second single-plane light incident surface facing the first single-plane light incident surface with the plurality of light sources therebetween,
a second light output surface, and
second protrusions protruded in the same plane in which the two light guide plates are adjacent from the second single-plane light incident surface, and
wherein in a top plan view of the output surfaces of the two adjacent same-plane light guide plates between which the plurality of light sources is disposed, the first light guide plate first protrusions and the second light guide plate second protrusions protruded in the same plane in which the two light guide plates are adjacent alternate with each other in a longitudinal direction of the first and second single-plane light incident surfaces, the alternating same-plane first and second protrusions respectively facing and disposed non-overlapping with the plurality of light sources in the same plane in which the two light guide plates are adjacent.

11. The display apparatus of claim 10, wherein
the first protrusions comprise first upper surfaces substantially parallel to the first single-plane light incident surface, and
the second protrusions comprise second upper surfaces substantially parallel to the second single-plane light incident surface.

12. The display apparatus of claim 11, wherein the light sources further comprise:
first light sources including the light emitting surfaces facing the first upper surfaces in a one-to-one correspondence, and
second light sources including the light emitting surfaces facing the second upper surfaces in a one-to-one correspondence.

13. The display apparatus of claim 10, wherein
each of the first protrusions comprises:
a first side surface inclined with respect to the first single-plane light incident surface, and
a second side surface inclined with respect to the first single-plane light incident surface and connecting the first side surface to the first single-plane light incident surface, and
each of the second protrusions comprises:
a third side surface inclined with respect to the second single-plane light incident surface, and
a fourth side surface inclined with respect to the second single-plane light incident surface and connecting the third side surface to the second single-plane light incident surface.

14. The display apparatus of claim 13, wherein the light sources comprise:
third light sources including light emitting surfaces facing the first side surfaces or the second side surfaces, and
fourth light sources including light emitting surfaces facing the third side surfaces or the fourth side surfaces.

15. The display apparatus of claim 10, further comprising a light guide member between the two adjacent light guide plates, wherein the light guide member surrounds the light sources.

16. The display apparatus of claim 15, wherein the light guide member further comprises:
a main body between the two adjacent light guide plates; and
a cover member connected to the main body and overlapped with a portion of the first and second light output surfaces of the two adjacent light guide plates.

17. The display apparatus of claim 16, wherein the cover member comprises a half-transmission layer substantially parallel to the light output surfaces.

18. The display apparatus of claim 17, wherein the half-transmission layer is a metal layer.

19. The display apparatus of claim 10, wherein
the display panel comprises a display area in which the image is displayed, and a non-display area in which the image is not displayed, the non-display area surrounding the display area, and
the light sources are in the display area when viewed in the top plan view.

20. The display apparatus of claim 10, wherein the light sources are divided into a plurality of light emitting blocks which are driven independently from each other.

* * * * *